(12) United States Patent
Jenkins

(10) Patent No.: US 7,363,024 B2
(45) Date of Patent: *Apr. 22, 2008

(54) SYSTEM AND METHOD OF ACCESSING AND RECORDING MESSAGES AT COORDINATE WAY POINTS

(75) Inventor: Michael D. Jenkins, Burke, VA (US)

(73) Assignee: Xybernaut Corporation, Chantilly, VA (US)

( * ) Notice: Subject to any disclaimer, the term of this patent is extended or adjusted under 35 U.S.C. 154(b) by 214 days.

This patent is subject to a terminal disclaimer.

(21) Appl. No.: 10/760,095

(22) Filed: Jan. 16, 2004

(65) Prior Publication Data

US 2004/0214550 A1    Oct. 28, 2004

Related U.S. Application Data

(63) Continuation-in-part of application No. 10/195,952, filed on Jul. 16, 2002, now Pat. No. 6,681,107, which is a continuation-in-part of application No. 10/102,325, filed on Mar. 20, 2002, now Pat. No. 6,480,713, which is a continuation of application No. 09/732,170, filed on Dec. 6, 2000, now Pat. No. 6,377,793.

(51) Int. Cl.
*H04M 11/00* (2006.01)
*H04Q 7/20* (2006.01)

(52) U.S. Cl. .................. 455/412.1; 455/456.3

(58) Field of Classification Search ........... 455/456.3, 455/421, 456.1, 414.3, 404.2, 3.02, 3.06, 455/412.1
See application file for complete search history.

(56) References Cited

U.S. PATENT DOCUMENTS

| | | | |
|---|---|---|---|
| 5,809,415 A | 9/1998 | Rossmann | |
| 5,852,775 A | 12/1998 | Hidary | |
| 5,970,122 A | 10/1999 | LaPorta et al. | |
| 5,983,109 A | 11/1999 | Montoya | |
| 6,119,014 A | 9/2000 | Alperovich et al. | |
| 6,208,866 B1 | 3/2001 | Rouhollahzadeh et al. | |
| 6,222,483 B1 | 4/2001 | Twitchell et al. | |
| 6,256,489 B1 | 7/2001 | Lichter et al. | |
| 6,266,533 B1 | 7/2001 | Zaden et al. | |
| 6,323,805 B1 | 11/2001 | Zou et al. | |
| 6,327,252 B1 | 12/2001 | Silton et al. | |
| 6,329,904 B1 | 12/2001 | Lamb | |
| 6,343,215 B1 | 1/2002 | Calabrese et al. | |
| 6,347,228 B1 | 2/2002 | Ludden et al. | |

(Continued)

*Primary Examiner*—Lewis West
(74) *Attorney, Agent, or Firm*—Pillsbury Winthrop Shaw Pittman, LLP

(57) ABSTRACT

The present invention is essentially a method and system for leaving and retrieving messages at specific coordinate way points within a commercial mobile radio service (CMRS) provider network. Users carry or transport interface devices for communicating over the network and are able to record and view messages at specific coordinate locations while traveling in the network. The location of the device is calculated by the device or by the network while the device is powered on and in within the physical boundaries of the network, or through a combination of both. Messages can be made available to network subscribers when their interface devices come within an area centered about a physical coordinate location. Personalized messages can also be left by subscribers at any coordinate point within the boundaries of the network. The invention can also be used to facilitate access of information about an asset when a technician comes within a physical proximity threshold relative to said asset.

13 Claims, 18 Drawing Sheets

U.S. PATENT DOCUMENTS

| | | |
|---|---|---|
| 6,356,761 B1 | 3/2002 | Huttunen et al. |
| 6,360,101 B1 | 3/2002 | Irvin |
| 6,377,793 B1 * | 4/2002 | Jenkins .................... 455/412.1 |
| 6,681,107 B2 * | 1/2004 | Jenkins et al. ........... 455/412.1 |
| 6,836,667 B1 * | 12/2004 | Smith, Jr. ................ 455/456.1 |
| 2001/0044309 A1 | 11/2001 | Bar et al. |

* cited by examiner

```
           Exemplary                            207
    Preference Code        Bit Table 000 ... 00     N-Bit Number with one
                       Bit for each        choice 00000    —     Do Not Disturb
        00001    —     Personal
        00010    —     Historical
        00100    —     Local Weather ( on demand )
        01000    —     Emergency & Informational ( traffic )
        10000    —     Commericial

* All remaining 26 ( $2^5-6$ ) words
      are used for combinations of the
      above 6.
```

FIG. 5

SYSTEM AND METHOD OF ACCESSING AND RECORDING MESSAGES AT COORDINATE WAY POINTS

CROSS REFERENCES TO RELATED APPLICATIONS

This application is a Continuation in Part of U.S. patent application Ser. No. 10/195,952 filed Jul. 16, 2002 now U.S. Pat. No. 6,681,107 issued Jan. 20, 2004 entitled "System and Method of Accessing and Recording Messages at Coordinate Way Points" which is a Continuation in Part of U.S. patent application Ser. No. 10/102,325 filed Mar. 20, 2002 now U.S. Pat. No. 6,480,713 issued Nov. 12, 2002 entitled "System and Method of Accessing and Recording Messages at Coordinate Way Points" which is a Continuation of U.S. patent application Ser. No. 09/732,170 filed Dec. 06, 2000 now U.S. Pat. No. 6,377,793 issued Apr. 23, 2002 entitled "System and Method of Accessing and Recording Messages at Coordinate Way Points."

INVENTION

The invention is essentially a system and method for accessing and leaving messages at physical coordinate way points. Using hand held, user supported, or car mounted wireless computing and/or communication devices, users can either leave or access messages which become available by virtue of the physical coordinate location of a wireless network subscriber's device.

BACKGROUND OF THE INVENTION

As our society continues to evolve and become more integrated with technology demand for wireless information increases constantly. Mobile phones, pagers, personal communications devices, wearable computers, handheld and car mounted GPS devices, and wireless personal digital assistants (PDAs) are becoming commonplace. These devices provide users with customizable content and specific information while they are on the move. Of particular utility, are positioning system devices, which convey to a person their physical location at a point in time. The global positioning system (herein after GPS) allows persons to pinpoint their location at any point on the earth to within a few meters of precision. The backbone of the system is the NAVSTAR satellite constellation, comprised of 17 low orbit satellites that transmit synchronized signals, which among other things, are representative of time. Originally designated for military use in location and ordinance guidance systems, the system is now available for public and commercial use. Individuals can walk or drive around with handheld devices costing only a few hundred dollars and know exactly where they are going, record coordinate way points, view their position in the context of maps, and record routes traveled. This has become a standard feature in luxury automobiles allowing drivers and passengers to view, in real or semi-real time, their location superimposed on a road map. The devices work by reading triangulated signal information from three satellites to determine a precise location. The differences in arrival times of the time-synchronized signals allow the device to calculate its position. The problem with GPS is that a separate receiver is needed to receive the satellites' signals and that the signal itself is very weak. Thus, any overhead cover, such as trees, tunnels, overpasses, etc. can prevent the receiver from receiving its signal.

Cellular and wireless networks are also capable of delivering this kind of position information to their subscribers. Through triangulation, signal strength measurements, angle of incidence measurements, GPS over cellular, and combinations of these techniques, cellular networks can pinpoint the location of a driver to within reasonable levels of accuracy. Especially in densely populated areas, where there are many cellular towers within close proximity to one another, it is possible to determine, within tens of meters of accuracy, the location of a user of a cellular phone.

In 1998, the Federal Communications Commission (hereinafter FCC) mandated in its rules for commercial mobile radio service (herein after CMRS) providers that the providers upgrade their networks to facilitate emergency 911 or E911 service, requiring them not only to connect the calls to the appropriate operator and transmit the caller's phone number, but also to transmit position information on the origination point of the call. The Commission adopted E911 rules in accordance with an agreement between the wireless industry and state and local 911 officials to promote wireless technologies and transmissions that provide important information to enable the 911 Public Safety Answering Point (PSAP) to promptly locate the 911 caller. The wireless E911 service was established to ensure that wireless phones automatically transmit the same vital data about a 911 caller's location as wireline phones. CMRS providers were expected to achieve transmission of the enhanced location information in two phases, with Phase I to begin Apr. 1, 1998. Accordingly, the E911 rules now provide that, for Phase I, carriers transmit a caller's Automatic Number Identification (ANI) and the location of the cell site or base station receiving a 911 call to the designated 911 PSAP beginning Apr. 1, 1998. These capabilities allow the PSAP attendant to call back if the 911 call is disconnected and to provide general location information to assist in the prompt dispatch of emergency personnel.

As for Phase II, carriers are to transmit more accurate Automatic Location Information (ALI) of a caller beginning Oct. 1, 2001, according to phased-in timetables for handset-based and network-based technologies. The specific requirements for Phase II state that covered carriers provide to the designated PSAP the location of a 911 call by longitude and latitude within a radius of no more than 125 meters in 67 percent of all cases, using Root Mean Square (RMS) methodology. The two prerequisites in the current rules for a carrier's obligation to implement either Phase I or Phase II are that: (1) the carrier has received a request for such service from a PSAP that has the capabilities of receiving and using the data, and (2) a mechanism for recovering the costs of the service is in place. The solution for the CMRS providers to Phase II can come from either the network or the handset; however, if the carriers choose the handset-based solution for Phase II deployment, they are required to begin selling and activating Phase II-compliant handsets no later than Mar. 1, 2001, without regard to the PSAP-related prerequisites. In November of 1999, the FCC amended its cost recovery rule to modify the requirement that a mechanism for cost recovery be in place before a carrier is obligated to provide E911 services. The FCC affirmed the requirement that a formal mechanism be in place for PSAP cost recovery, but eliminated as a barrier to E911 implementation, any prerequisite that carrier's E911 costs be covered by a mechanism.

Successful implementation of E911 will establish 911 as a universal number so that a user of a wireless phone could simply dial 911 regardless of whether they are in their home network or not. This will require the wireless provider to transmit simultaneous to the call, position information on the user to the 911 operator so that emergency personal can be dispatched to the location of the caller. Upgrading their networks to provide this service is a significant cost to both the wireless provider as well as the local government who employs the 911 operators and maintains the call receiving hardware. This has been a point of contention by the wireless service providers. They have been reluctant to adhere to mandates to provide E911 service without a cost recovery mechanism in place due to the fact that providing this service costs them additional money, reducing their profit margin and does not generate any additional revenue. It would be desirable for the wireless providers to have a mechanism for generating a return on investment in the infrastructure required to provide E911 service. Such a mechanism would make compliance with the FCC Phase II mandate more attractive to CMRS providers and may provide a way for them to increase their profitability by expanding their commercial services to include location specific content.

Currently, there are three variants of technologies for determining the location of a network activated mobile phone. Broadly, these fall into the categories of network-implemented, handset-implemented, or hybrid. Network-based answers are usually based on a combination of systems called time of arrival (TOA), time difference of arrival (TDOA), and an amplitude difference based on angle of arrival (AD-AOA). Under TDOA, the time difference between a signal from a mobile phone arriving at three different base stations are measured, giving a calculation of the mobile's location. AD-AOA calculates the angle of a signal arriving at two base stations, again yielding a location, and the combination of these two technologies yields accuracy in the region of 100 meters. All methods are currently in the experimental stage, thus, a uniform standard which will operate across all proprietary CMRS networks has yet to be established.

As for handset-implemented solutions, GPS remains a viable solution and the most probable in the short term. This technology is well established and with the recent removal of the signal degradation, accuracy on the order of tens of meters can be achieved with a small GPS receiver. Handset-implemented solutions relying on GPS devices will require additional chips and software added to handsets so they can track the satellites upon which the GPS system relies. To improve accuracy and in-building coverage, the system uses a secondary signal from the network.

A third, hybrid system uses observed time difference or OTD, and is implemented both in the handset and in a network server based on uploaded measurements from handsets of the time of arrival of signals from at least three different base stations.

There has been recent discussion of potential cost recovery mechanisms that could extract commercial value from the expenditure associated with providing Phase II E911 service. These mechanisms are based on providing location specific marketing information to wireless subscribers to offset costs. An article in *Internet Week*, Sep. 18, 2000, by Teri Robinson, entitled, "Wireless Applications—Location is Everything—Wireless location services may prove that the first law of real estate is also true for the Net," discusses some of these. The article states, "As location services evolve, it's conceivable that a user travelling down the New Jersey Turnpike would be hit with offers from fast food restaurants, outlets or anything else along his route that might want to lure him toward, for example, the offer of a 99 cent Big Mac two exits away . . . Location services also offer retailers an opportunity to dovetail e-commerce and brick-and-mortar strategies, using wireless technology to drive customers into physical stores. Barnes & Noble.com, for example supports Palm VII's auto-find feature, which helps users find the location of the three nearest Barnes & Noble stores. The response delivers information about store hours, telephone numbers, and locations, as well as special events such as book readings and signings." The article also concedes that there are other existing location solutions, however, they are limited in their capability and fail to fully solve the problem. "Among the most tried and true location methods is the one that has travelers voluntarily enter the zip codes of their locations. It doesn't require any special equipment or investment, and it certainly allays privacy issues. However, the problem with this approach is it's dependent on the user to provide vendors with the needed information on location. Even when the user is reliable, he may not be able to provide that information.

Another exemplary discussion of the cost recovery solutions is provided in *Technology Review*, September, 2000, authored by John Adam, entitled "Internet Every-where." The article admits that the value of wireless handhelds will be greatly increased when the network can tell where they are. As an example, the article states " . . . the screen of a wireless device could continuously change as you walk down a street, tempting you with various offers. Your spouse's screen might differ from yours, even through you are near the same bookstore, restaurant or shopping center. When you pass a certain store, your To Do list stored on a network reminds you to pick up an item that has been spotted in the store's virtual database . . . Or maybe a local store wants to drum up business one Thursday morning. It offers a discount for the next two hours to all receptive people within a 1-mile radius. Its also conceivable to blend personal buddy lists with geographic location, so any networked friends passing within five blocks will know you are at the coffee shop, amenable to old fashioned face-to-face conversation." The article, however, is directed towards possible future capabilities and features of commercial services that could be provided to network subscribers that utilize the same infrastructure facilitating Phase II E911, rather then disclosing any practical functional embodiments to perform these services. The article also fails to mention other possible uses of location specific content.

Still further, Bar et al (U.S. 2001/0044309 A1) discloses a method and system for providing real-time location-based services whereby real time location information of cellular telephone users are distributed to various third party information subscribers. In one embodiment, Bar et al discloses information or advertisements being provided to the user based on a present location and/or the user's personal profile. In an alternative embodiment, a server can "push" information to the user by actively placing an automated phone call to the user upon entering the local area of a matching event. However, Bar et al limits the invention to one-way communication from the network to the user and fails to mention the user actively communicating with the network. Further, in the Bar et al system, a call is required to be made either by the user to the network or the network to the user in order for the user to interact with the network. The present invention in not limited in this manner.

Additionally, Alperovich et al (U.S. Pat. No. 6,119,014) discloses a system and method for displaying short messages depending upon location, priority, and user-defined indicators wherein when a subscriber sends short messages to another subscriber, the originating subscriber can specify the time of delivery of the message, including the time(s) to repeat delivery of the messages. In addition, the originating subscriber can specify the priority associated with the message or that the message is to be delivered only when the called subscriber is in a certain location. However, Alperovich et al does not allow users to post and receive messages to specific coordinate locations and requires the message to have a specific recipient.

Thus, there exists a clear need for a cost recovery mechanism for CMRS providers for upgrading their wireless networks to support E911 service as the costs associated with implementation are significant. Such a mechanism will speed up compliance with the FCC rules and help to ensure cost-effective E911 service for wireless customers.

Therefore, it is an object of this invention to provide a cost recovery mechanism for CMRS providers which is devoid of the above problems.

It is another object of this invention to provide a cost recover mechanism for CMRS provides to recover at least some of the costs associated with meeting FCC requirements with regard to providing Phase II E911 service.

It is also an object of this invention to provide a communication system for accessing information over a wireless network at specific latitudinal and longitudinal coordinate locations or way points.

Another object of this invention is to provide a system for automatically or manually retrieving posted information at coordinate way points.

An additional object of this invention is to provide a system for leaving messages at specific coordinate way points or centered about specific coordinate way points.

Still another object of this invention is to provide a system for receiving commercial information while traveling, wherein said information becomes available when a person enters an area centered about a point and said commercial information is related to business entities located within or near said area.

Yet another object of this invention is to provide a system for leaving personalized messages for other persons at specific coordinate way points, wherein said messages are accessible by other persons when the other persons are near the coordinate way point.

Still yet another object of this invention is to provide a system for pushing or pulling dynamic information in a commercial mobile radio service network said information being germane to a specific coordinate location of a network subscriber device.

A further object of this invention is to provide a system for retrieving information about a piece of equipment or a hardware installation site when a technician or inspector nears the physical location of the site.

Still a further object of this invention is to provide a system for notifying other persons of a person's location within a designated radius.

Still yet a further object of this invention is to provide a system for remotely posting messages to a specific coordinate location or asset location.

These and additional objects of this invention are accomplished generally by a system and method for leaving and retrieving messages at coordinate way points.

SUMMARY OF THE INVENTION AND PREFERRED EMBODIMENTS

In a preferred embodiment of the invention, the present invention provides a system and method for accessing and retrieving messages at specific coordinate way points or areas centered about specific coordinate way points. The present invention will allow network subscribers to retrieve commercial, personal, and informational messages at specific locations and will also allow them to leave personalized messages at specific locations using a subscriber device. Additionally, the present invention will provide a cost recovery mechanism for CMRS providers to recover costs associated with upgrading their networks to facilitate E911 Phase II coordinate capabilities by providing these services together with E911 service to their subscribers. For the purposes of this disclosure and claims the term subscriber device will include mobile phone devices, car-based communication devices, personal communication devices, communication enabled wearable computers, personal digital assistants, portable computers, internet appliances, or other mobile communication and computing devices which are operable to communicate with a commercial wireless network. By wearable computer is meant a computer such as that disclosed in U.S. Pat. No. 5,844,824, assigned to Xybernaut Corporation and successfully commercialized under the name Mobile Assistant, in addition to any other body-worn or user-supported computing device which is capable of wireless communication.

Using triangulation or one or more other proposed techniques, the network will be able to pinpoint a relative location of the user of the device, check the user's preferences and selectively allow the user to view any applicable messages. For the purposes of this disclosure and the claims, triangulation will be taken to mean an algorithmic approach to calculating a location that three or more signals either coming from or going to separate locations and uses the difference in their arrival times, the difference in their relative strengths, or the differences in the angle of arrival, to derive a location. When the user enters an area, centered about a latitudinal and longitudinal coordinate point, he will automatically receive a message if his preferences permit receiving the particular type of message that is available. Additionally, he will be able to record a specific location and to attach a message, file, or other information to that location so that it may be available to himself and others. The device will in a preferred embodiment possess at least one user interface for leaving and retrieving messages, and optionally one interface for each. This interface will include a screen on the device, software, voice activated controls, speech output, push buttons, virtual keyboard, and combinations thereof. Alternatively or in combination with, a personal computer may be utilized to upload messages to a specific location.

In one permutation of the preferred embodiment, users will carry hand held devices which communicate over the network. The devices can be mobile phones, communication enabled PDAs, personal communications devices, hand held internet appliances, or other portable computing devices capable of communicating over a CMRS network. They will use these devices to interact with the network and to access and record messages at specific physical coordinate locations. The storage, display and audio capabilities of these devices will be used to store, download, upload and replay the messages in a manner analogous to the way current hand-held communication devices are used to make calls and to upload and download information. The device will possess a unique identification number, such as the phone number, which identifies it to the CMRS network.

In another permutation of the preferred embodiment of the invention, a subscriber has a device in or attached to his vehicle which functions like a wireless phone and is activated in a wireless network such as the Sprint® PCS network. The subscriber device will perform as a standard mobile phone, using CDMA, Wide Band CDMA, TDMA, FDMA or other known or previously undeveloped communication protocols for communicating within the wireless network. The device will have an integral or attached display screen which could be built into the dash board of the car. The screen will be used to display the content of graphical messages and optionally to serve as an interface with the network. Like existing communication devices, the device will have a unique code, such as the phone number of the phone, which identifies and distinguishes it from other devices within the network.

In every embodiment, a unique code of the subscriber device will allow the network to identify him uniquely. Either the user's subscriber device or the network will store preferences with respect to different types of messages that may be received. Potential message types can include personal messages, historical messages (e.g. plaque's along the roadside which convey historical information about the immediate area), informational messages (e.g. Traffic messages, accident information, alternate route information, etc.), commercial messages (e.g. Advertisements for local businesses which are near the location of the user), dynamic messages, and directional messages.

As to personal messages, subscribers of the network may be given the option of leaving a specific message at a particular coordinate location. This can be facilitated by using the subscriber's device. He merely pushes a button at a specific location causing the device to save the physical location. Then he can push a "record message" button which allows him to speak a message into his device. This message could be directions to the subscriber's house from the specific location or any other personal message. The message is then uploaded to the network where it will become available to other network subscribers. It should be noted that not only text and voice messages can be left on the system, but also video messages, including video stills and motion video, attachments, and combinations of video and audio can also be left. The person creating the message can designate whether the message is available to all subscribers, only the persons stored in the memory of the subscriber's device, a subset of the persons stored in memory, or even a single person. The person can also designate the time period for the message to be available, in the absence of a default time period, so that messages are not left forever, clogging up the storage space on the network and overwhelming the user devices. This will enable subscribers to leave "virtual post-it notes" or "virtual graffiti" nearly anywhere. The message could even be a reminder to left by a person for himself, or a video or audio clip.

In an additional embodiment, the system can be used to facilitate dynamic, near real-time messages. For example, when a person enters the domain of an asset such as a bus or train stop, either automatically, or at the initiation of the user, his device receives a message informing him of the arrival time of the next bus or train. The message could state "bus 12B will arrive in approximately 10 minutes." This information would allow the recipient to plan his time, if he wanted to go to a nearby store to purchase something or if he would be better off to stay and wait for the bus. This will require the bus to also be equipped with a device so that its position can be monitored as well. This information could be automatically pushed to the user's device or it could be pulled by him in response to an issued command.

In another related embodiment, the system and method of the present invention can be used to create affinity groups comprised of other network subscribers. The device itself can be used as a sort of pager to alert others of their presence within a physical location threshold within the entire area of the CMRS provider network. For instance, if a user 1 has user 2 listed in his affinity group, and user 2 comes into a geographical area within a pre-specified radius of the location of user 1, then a message can automatically be received on the device of user 1 announcing the presence of user 2. Conversely, a message could appear on user 2's device alerting him of his close proximity to user 1. This affinity group feature will also allow creators, and optionally members, of a group to leave a single message to all members of a group that may or may not be tied to a specific coordinate location. For instance, when a team of employees arrive in a city for an event, such as sales meeting or a trade show, the members will each be able access a general message left for all of them when they arrive at or nearby the airport. This information could be information on their accommodations or a schedule of the upcoming events. The system may also optionally allow group members to send near real-time messages to other group members at once, simply by designating the group, without regard to any specific coordinate location. This may be particularly beneficial to business customers. Each customer account, such as XYZ company, could administrate its own affinity groups and control group messages sent out. Also, it would be useful for the CMRS provider to have a have world wide web (WWW) interface to allow persons to enter a city, an address, or a location such as an airport, and to be able to tag a message to that location without having to actually drive through that location for the purpose of attaching a message to that location. For example, a persons accesses the WWW interface and chooses to leave a message for an individual or for an affinity group at Los Angeles Airport, or at any point in the city of Denver. When the individual or group members reach the location, the message will appear on their device.

In yet another embodiment, the present invention will allow a maintenance or inspection person to go to the sight of a fixed asset such as a piece of equipment, transformer station, cellular tower, etc., and once he arrives at the sight of the asset to receive the information about the asset. Such information could include repair records, date of installation, technical information such as schematics, steps for performing repair or inspections on the asset, etc. The technician will carry or wear an interface device with integral display that will allow him to view and reference the transmitted information about the specific piece of equipment or asset. This will allow him to have access to information about a device without having to carry it with him. Additionally, as he leaves the site to go to another he can simply erase the dynamic memory in his device so that he has room to receive information about the next device. Any work performed or notes made by the technician may be added to a historical log and uploaded to the system so that they will be available for future reference. In this manner, if a different technician returns to the site at a later date, he will have a full history of the device. For example, if the previous technician made a note that a specific part was suffering wear and may need replaced at the next inspection/servicing, the new technician would be alerted to look for that rather then starting fresh each time he returns. This will increase efficiency and reduce downtime due to equipment breakdown.

In yet an additional embodiment, the present invention can be used to facilitate orienteering-type gaming and even military applications. For instance, specific instructions or messages could be left for persons, when they get to a certain area centered about a specific latitudinal and longitudinal coordinate location. The person leaving the message can dictate whether a code is required to access the message or if a list of persons, characterized by the unique number of their device, can access the message. If the former, a message will appear on the device of the person entering the area, requesting him to enter his access code to actually receive the message. In military applications, the system of the present invention could be used to leave limited access messages for troops at specific coordinate locations or issue warnings if someone is going off course.

In a still further embodiment, the present invention would allow the subscriber or user to control the level of granularity with which information would be made available to the user. For example, this could range in the exact x-y coordinate location to 5 miles of the x-y coordinate location. Each step in the zooming in or out from the position could be set at ⅛ of a mile or approximately 600 feet. This would allow the subscriber to designate restaurants serving Chinese food, for example, which have messages such as coupons near the subscriber's physical location and the ability to enlarge the requested area by ⅛ mile from the physical location of the subscriber. This feature also allows the subscriber to filter available messages to those that are near the subscribers intended route thus not overwhelming the system and the subscriber's device with undesired messages.

BRIEF DESCRIPTION OF THE DRAWINGS

FIG. 5 illustrates an exemplary preference code bit table.

DETAILED DESCRIPTION OF THE DRAWINGS AND PREFERRED EMBODIMENTS

Figure 1:
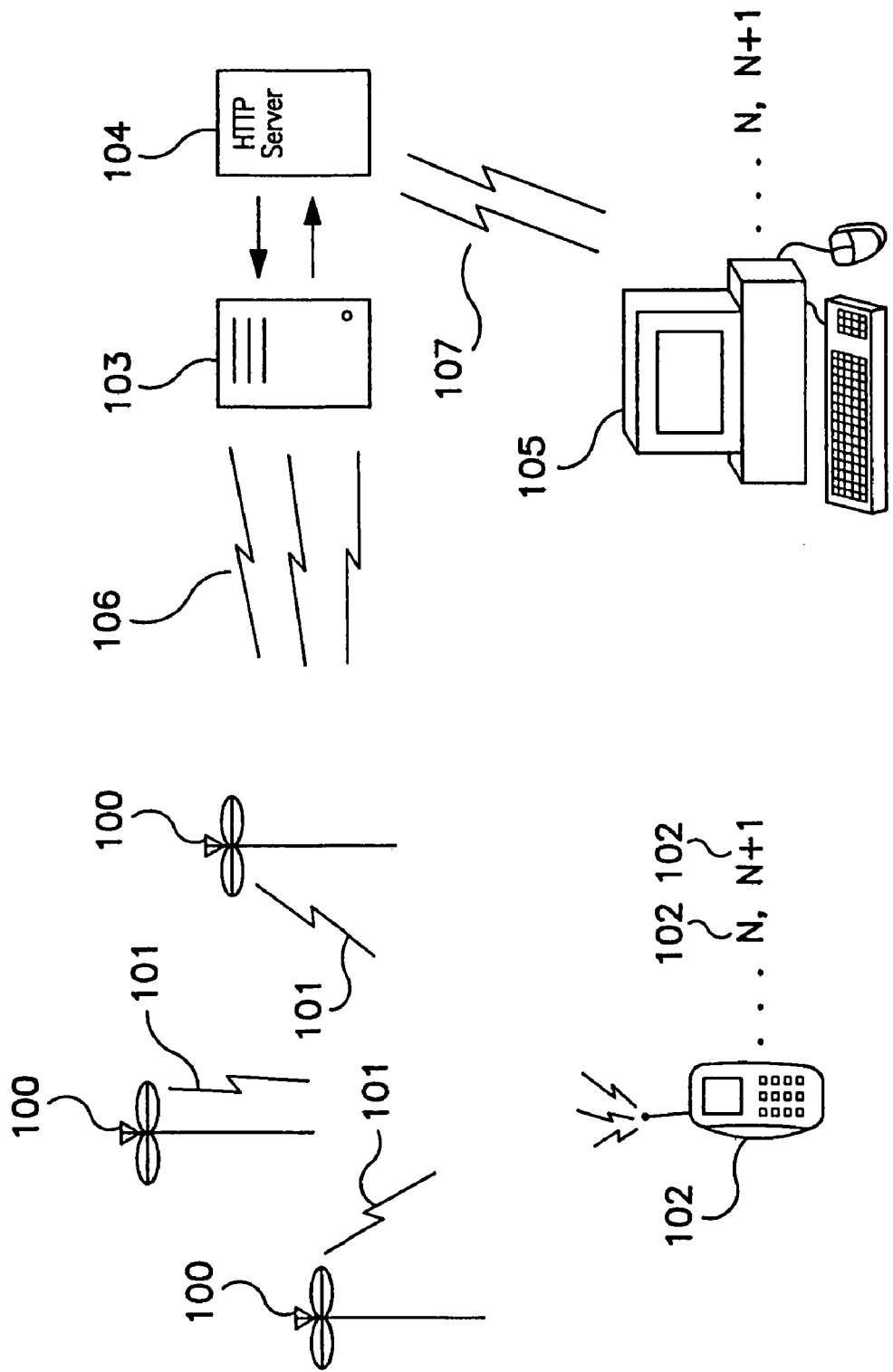
FIG. 1 illustrates an overview of the system components of the present invention.

The system and method of the present invention will now be discussed with specific reference to the figures. FIG. 1 illustrates an overview of the entire system and method of the present invention. The essential components are a commercial mobile radio service network comprised of wireless receiving towers 100, a hardwire backbone switching network and data management server 103 communicating electronically over communications link 106, a plurality of user communication devices 102 communicating wirelessly with receiving towers 100 over communications link 101, additionally and/or alternatively a plurality of user personal computer devices 105 communicating electronically over communications link 107, and an HTTP server 104 for receiving communication from said computer devices 105, routing message and subscriber information to the data management server 103. One of ordinary skill in the art will appreciate and understand that subscriber communications devices 102 can include mobile phones, car mounted phone, wireless internet appliances, personal digital assistants (PDA), wearable or otherwise portable computers which possess communications hardware or other suitable communication means. By "possess communications hardware" is meant that the communication device is embedded, attached, removable attached, integral to, or communicating with said computer. In one embodiment, users will carry the personal communication devices 102 on their body such as wireless communications devices commonly known in the art and successfully commercialized by companies such as Nokia Inc., Ericsson Inc., Motorola Inc., Palm Corporation, and Hand Spring, among others. These devices will look and function like existing state-of-the art wireless communication devices but will add the functionality dictated by the present invention. Either hardware in the user devices 102 or hardware in the CMRS network 100, 101, 106, and 103 will determine or triangulate the location of the device 102 on a near real-time or on-demand basis. This will allow the users to record their location and to access and record messages that are located in an area centered about a specific coordinate way point.

Figure 2A:
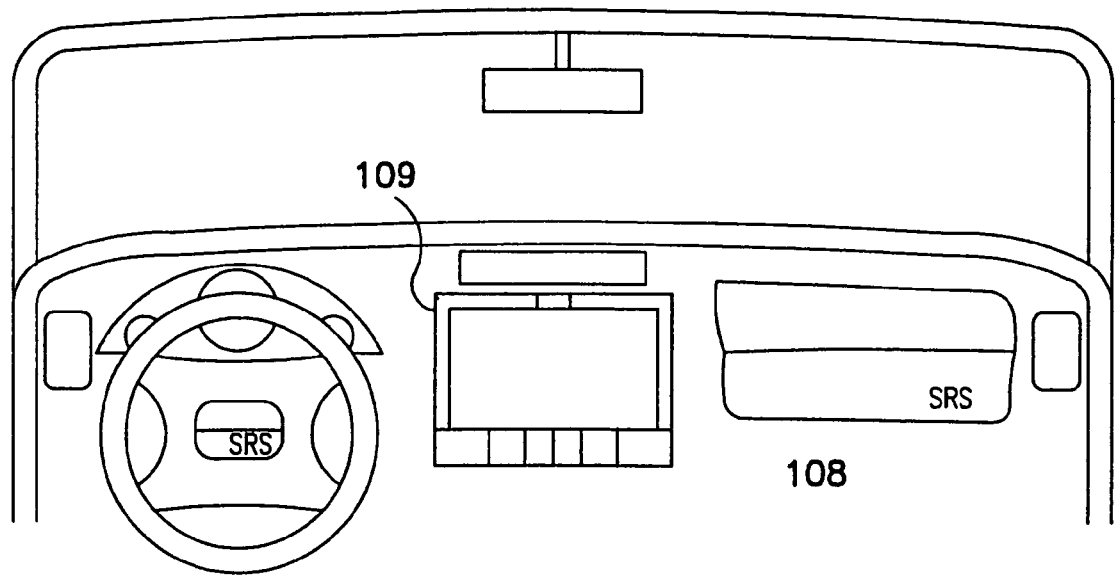
FIGS. 2A and 2B illustrate an automobile-based embodiment and user device of the system of the present invention.
Figure 2B:
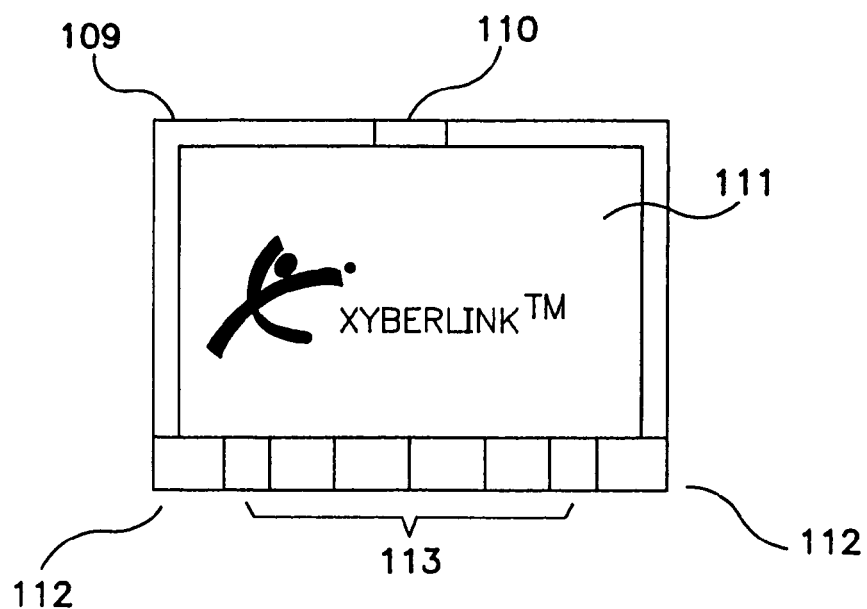

FIG. 2 illustrates an alternative embodiment wherein the user communication device 109 is mounted removably or permanently in the user's automobile 108. The device will contain an integral display screen 111, a housing 109, a microphone 110, speaker(s) 112, interface control buttons 113. Optionally, the display screen 111 will be a touch screen display screen. Preferably the device will be responsive to voice commands facilitated in one embodiment by external microphone 110. In this manner, when a CMRS subscriber is driving in his automobile 108 he will be able to receive messages when his automobile 108 enters an area centered about a specific coordinate way point. Also, he may record the coordinate way point by pushing a button on his car-mounted communication device 109 while passing the point, or by speaking a command to record the location. After this, he is able to leave a text or spoken message to be associated with the location through one of several methods, including through the device itself 109, calling into the network, and by using his computer 105 to communicate with HTTP server 104.

Figure 3:
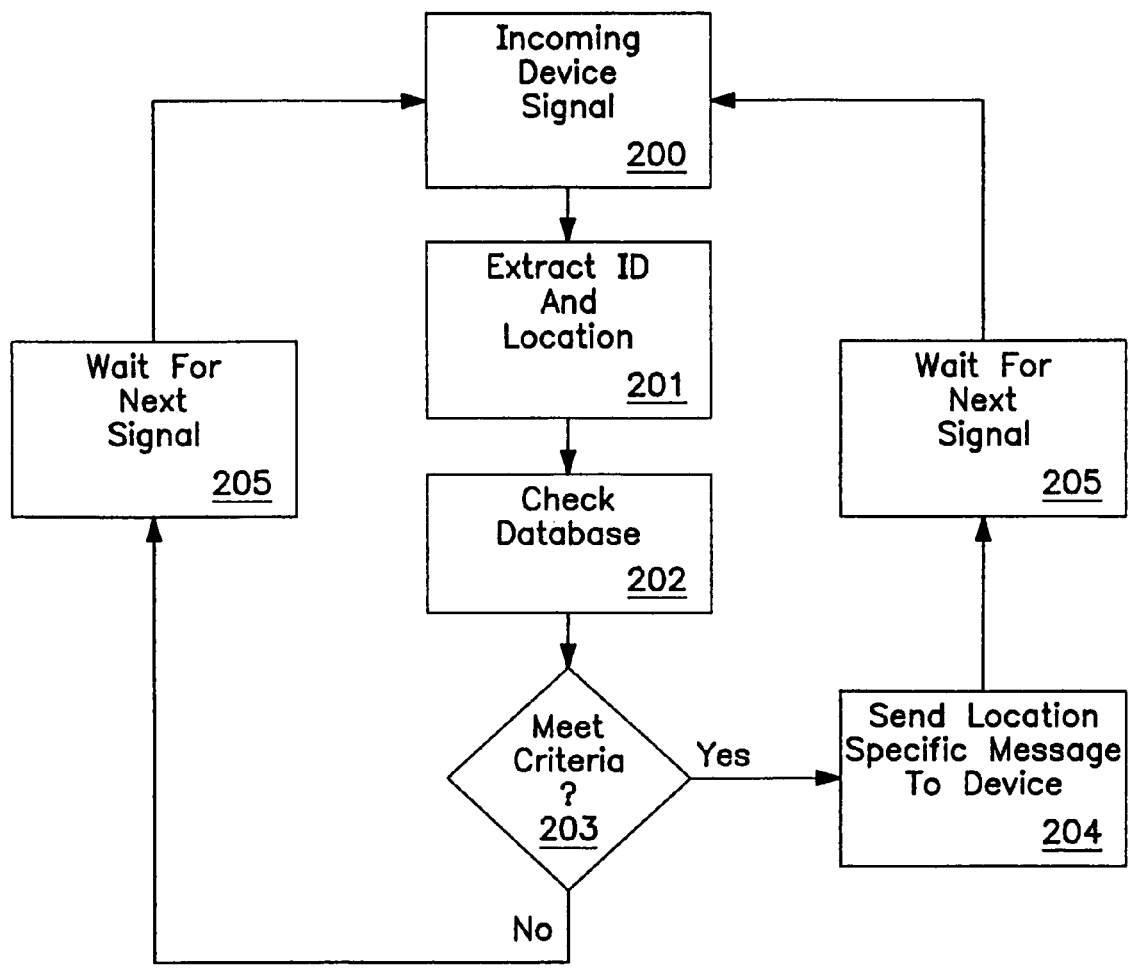
FIG. 3 illustrates a flow diagram representative of how the system monitors the location of the subscriber devices and determines whether or not to send a message.

FIG. 3 illustrates the process of the network monitoring the progress of a user device 102 or 109 through the network. At box 200, a beacon signal from the device 102 or 109 is received by the data management server 103. Such signals are notoriously well known in the art and are utilized by mobile phones, pagers, and personal communication devices so that a network can "know" when a user has his device on and is within the influence of the network, and also his approximate location within the network as measured by the closest tower(s). The reason for this is that when someone receives a phone call or a page, the call is not broadcast throughout the entire network, just to the towers near to or communicating with the subscriber's device. When the beacon signal is received, the information conveyed by the signal is extracted, at box 201. This information includes the ID (the device number or phone number), the location of the device, and optionally preference information with regard to messages. Next, at box 202, the database residing in the data management server 103 is checked to determine if there is a message accessible to that person at that location. At box 203, a decision point is reached. If the query criteria is not met, that is to say there is no message (the location is not correct or preferences do not allow a message to be received, both conditions being necessary and neither being sufficient) then the system resumes to the original state at box 205, waiting for the next beacon signal. These signals will be sent repetitively at certain time intervals. This could be anywhere from seconds to minutes, but will probably be on the order of minutes to reduce calculations performed by the network or user device. Alternatively, these time intervals could also be set by the user to affect performance as desired. As an example, it may be desirable to turn this feature off is a user is stationed at a specific point such as at the office, at home, attending an stationary event, etc. to conserve power. If at decision box 203, it is determined that the criteria for sending a message is met, then a message is sent at box 204 to the specific device 102 or 109. Then the system returns to the wait state at box 205 for the next time interval to elapse and the next beacon signal to be received 200.

Figure 4:
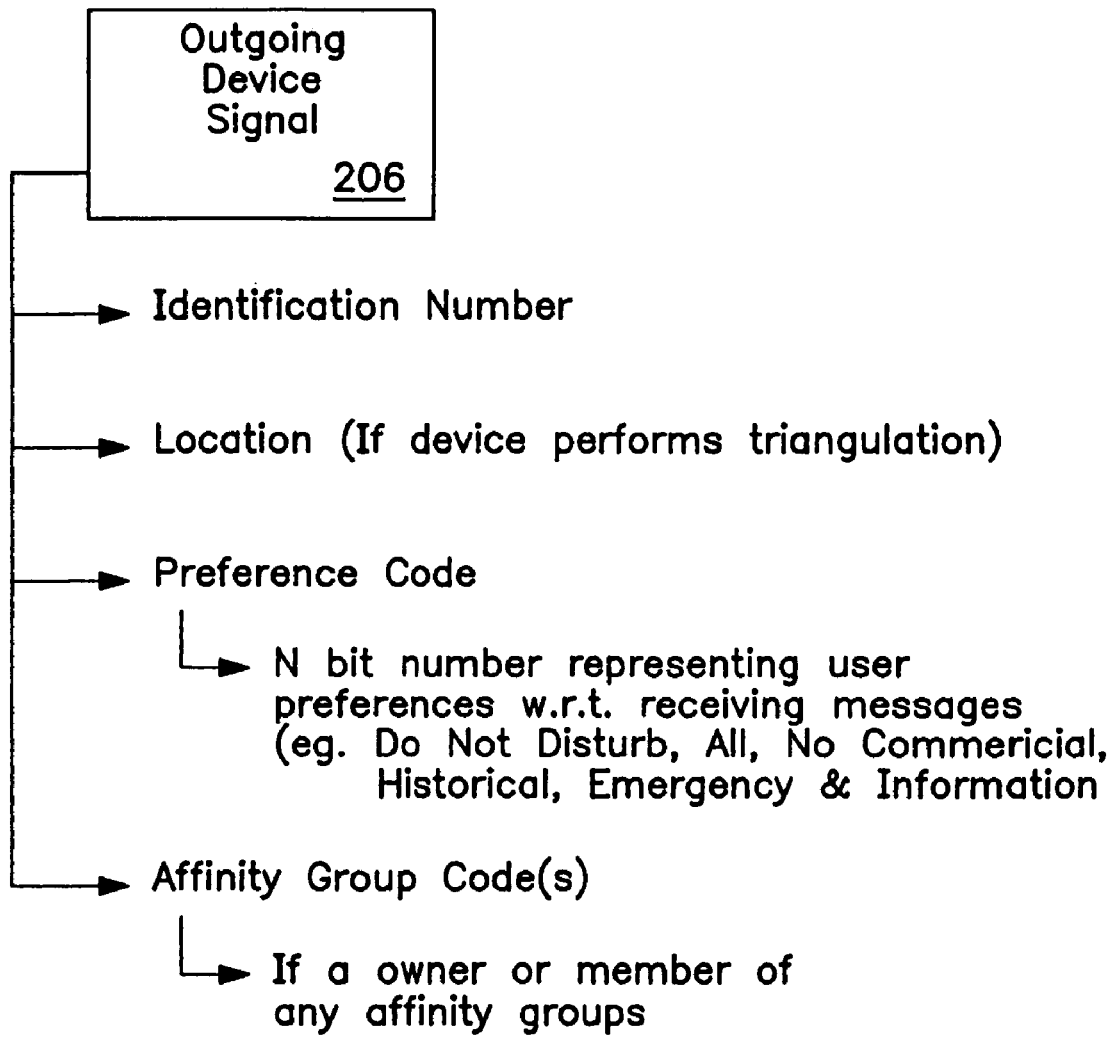
FIG. 4 breaks down an exemplary outgoing device beacon signal and the information contained therein.

FIG. 4 illustrates an exemplary composition of the outgoing device beacon signal which is transmitted periodically to the CMRS network. Box 206 is representative of the signal. It is comprised of an identification number (generally the device's phone number), the location of the device in 2 dimensional space (if the device performs the triangulation), a preference code, and an affinity group code, if the person is a member or owner of any affinity groups. The preference code is an N bit boolean number wherein each bit turns on or off certain preferences with respect to receiving messages. This information is written stored in the data management server 103. The affinity group code is a group-specific code with a leading or trailing identifier bit to represent whether the subscriber is a member or owner of a specific affinity group. FIG. 5 illustrates an exemplary preference code bit table 207. In this table 207, the preference code is 5 bits long allowing for 6 unique content preferences, including a "do not disturb" setting represented by 00000. There are $2^5$ unique combinations or words that can be created by these 5 bits, thus 26 1combinations of 00000, 00001, 00010, 00100, 01000, and 10000. However, one of ordinary skill in the art will understand that either more or less bits may be required depending upon the different categories of messages to be received. Additionally, it is a general practice in the field of programming and signal transmission to reserve bits for future allocation so that as new features and services come on-line, they can be integrated into the existing platform as easily and cheaply as possible. One of ordinary skill in the art will appreciate and understand that more or less information my be necessary in the outgoing device signal as is necessary to support the available functionality without departing in spirit or scope from the present invention.

As to privacy of the network subscribers, by putting their device in the do not disturb mode, their position will not be monitored by the network. Additionally, it may be desirable to utilize a scheme for preventing the direct transfer of coordinate information. This could be facilitated by maintaining two separate databases. When the device or network calculate the location of a user, a closest grid number is assigned. Each wireless network can be divided into grids. A closest fit algorithm can be used to take the actual location and map it to a predefined grid point. The actual location of the point can not be deciphered by the looking at it. Available messages are stored in association with the grid numbers only. In this fashion, a grid number is sent out with the outgoing device signal, rather than a location. The system merely matches grid numbers with messages so the system is not directly tracking the location of a user. It is merely providing content which is tied to a code that is correlated to a location. This may also expedite implementation, by providing a standard for location identification, i.e. grid points, that can be extended across all wireless communication platforms. However, it is important to note that even if the person has their phone in the do not disturb mode, that there is an exception handler for cases when they are actually dialing 911. This will insure that position information will be sent to the PSAP taking the call.

Figure 6:
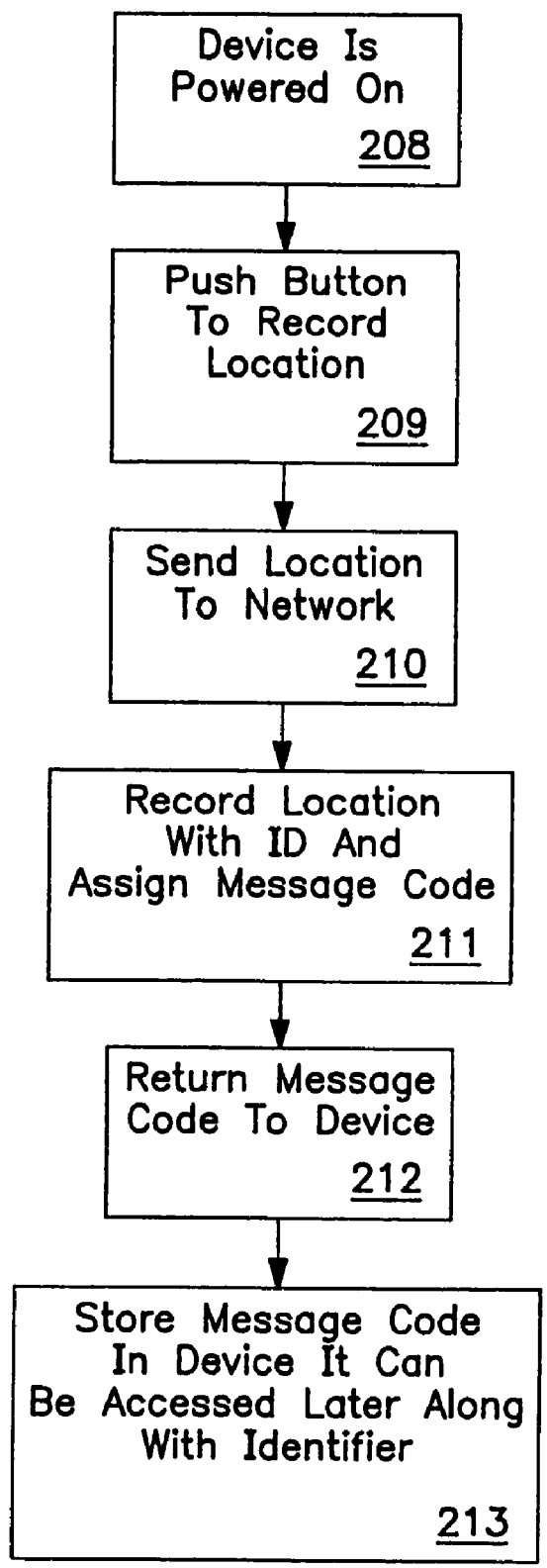
FIG. 6 illustrates a flow diagram representing the sequence of recording a coordinate way point and receiving a message code associated with the way point so that a message can be associated with the location.
Figure 7:
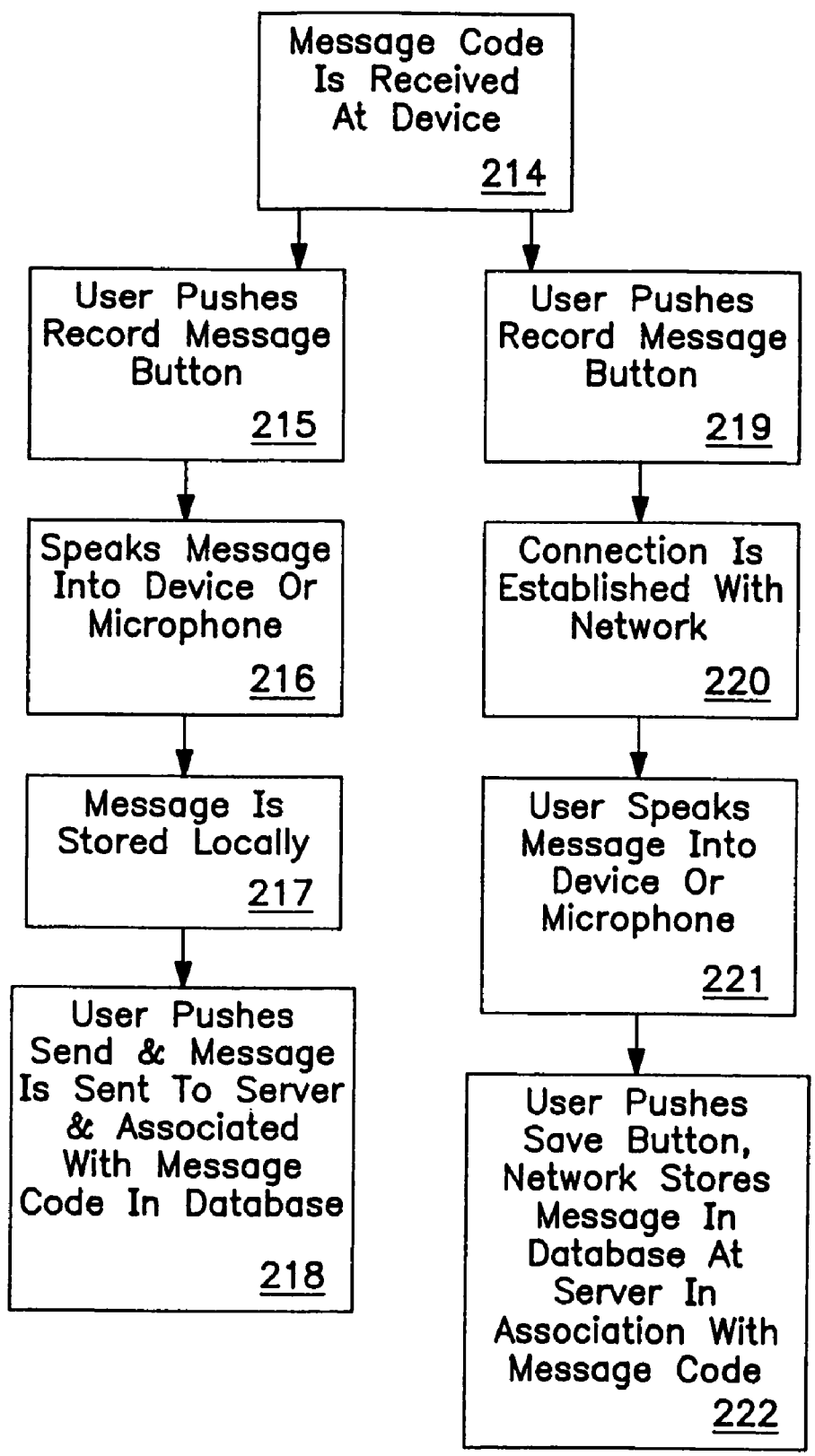
FIG. 7 illustrates two alternative pathways for transferring a message associated with a message code to the network using the user's communication device.

FIG. 6 demonstrates the process of recording a coordinate location so that a message can be associated with the specific location. In box 208, the device is in the powered state and located within the influence of the CMRS network. When a specific location is reached where a person desires to leave a personal message, they push a button at box 209 on their communication device 102 or 109 to record the physical location at that instant in time. Alternatively, this can be affected by a voice command to "record location" or other syntax affecting the same result. By performing this command, the location is then sent to the network at box 210 or the network is requested to record the location depending upon whether the positioning is performed by the device or by the network. The location is then recorded along with the ID of the device and it is assigned a unique message code so that it can be referred to at block 211. At block 212, the message code is then returned to the device, so that it can be stored in the device along with an optional text or spoken identifier so that it can be accessed later or so that a message can be associated with a specific message, box 213. Once the code is received at the device, there are one of several possible methods of recording a message to be associated with the specific code and location. In FIG. 7, the message code is received at the device 214, creating at least two possible step sequences. In the first, the user pushes a "record message" button 215. He then speaks into the device itself or into an attached or communicating microphone 216 and the message is stored locally 217 in the device's memory. The microphone could be a wireless Bluetooth microphone such as that which is manufactured by Ericsson Corporation. The user then pushes a "send" button, or speaks a "send" command, causing the message to be sent to the data management server 103, where it is stored in association with the message code, in the server's 103 database.

Alternatively, the user can push a "record message" button, or speak a "record message" command 219, which causes the device to establish a live connection with the network 220. The user then speaks his message into the device or into a microphone attached to or communicating with the device 221. The user then pushes a button or issues a command that causes the message to be stored directly in the database at the server in association with the message code 222, and terminates the live connection with the server.

Figure 8:
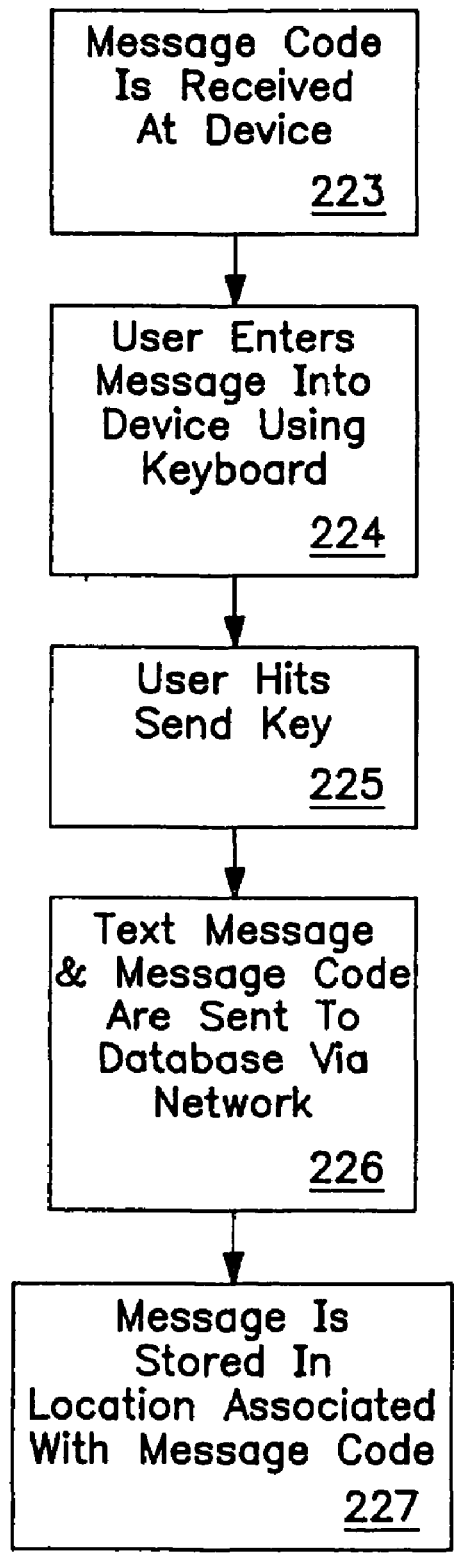
FIG. 8 illustrates an alternative method for transferring a message associated with a message code to the network using the keyboard integral to the user's communications device.

There are other methods for sending messages to the network that are specific to facilitating the entry of text messages into the system. Refer to FIG. 8. At box 223, the message code is received at the device, which has been generated and returned by the network. The user then enters a message into the device using a keyboard, which is integral to the device at step 224. This could be the keyboard inherent to most mobile telephone devices, or it could be a keyboard revealed when the device is opened about a hinged joint integral to the device. An example of such a keyboard is the one inherent to paging devices such as those manufactured by Motorola Corporation, particularly the Talkabout T900 2-way pager which is supported by several wireless service and paging providers. The device is hinged along one of its long axis to reveal a miniature keyboard and display screen. The keyboard could also be a soft keyboard which is displayed on a display screen and is activated by touch or by stylus. Alternatively, it may be a separate keyboard such as a miniature keyboard attached to a wearable computer. At box 225 the user hits the "send" key or issues an analogous command causing the text message and message code to be sent to the data management server 226. The message is then stored in a location at the server in association with the message code 227.

Figure 9:
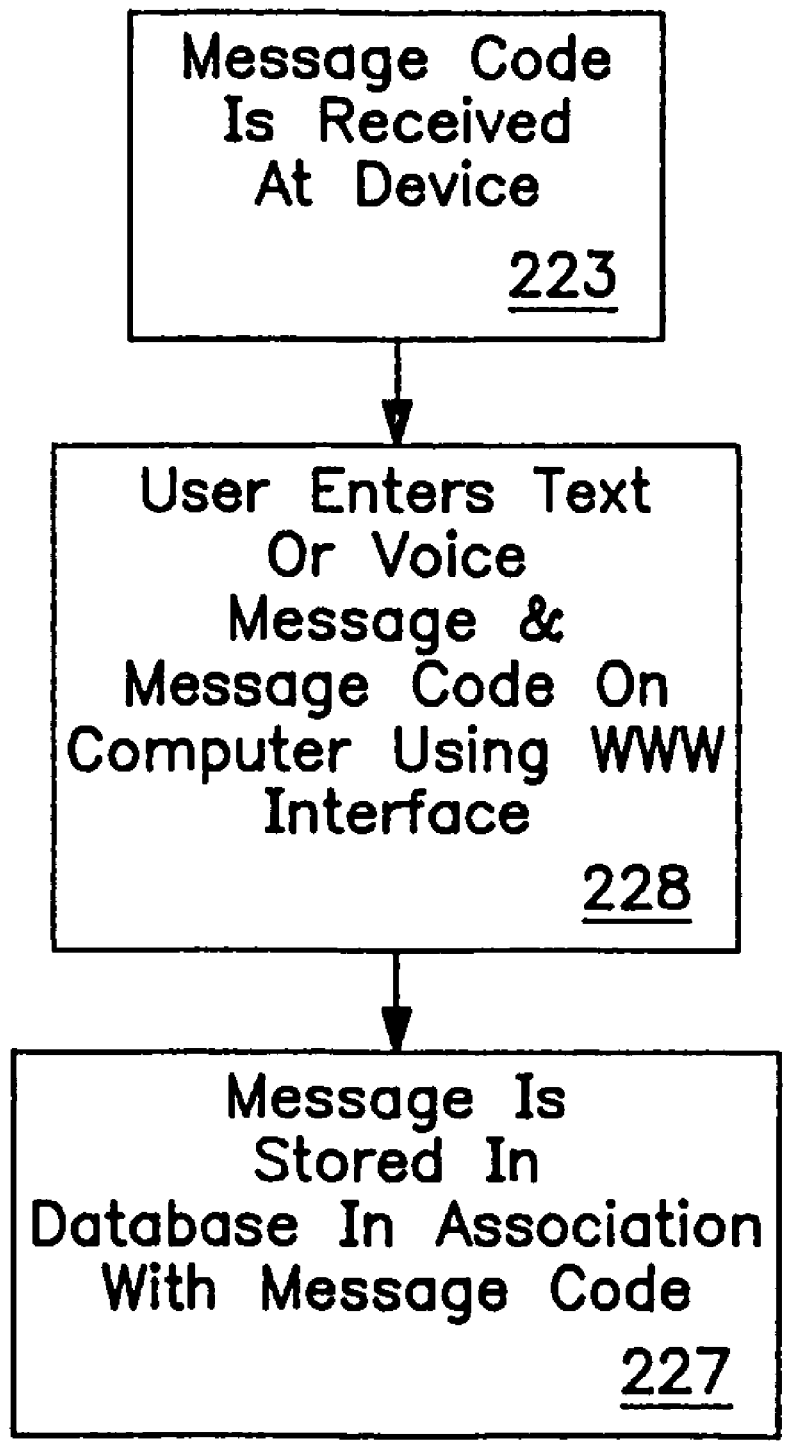
FIG. 9 illustrates an alternative method of entering a message associated with a message code to the network by using a World Wide Web interface and a personal computer.

In yet another alternative embodiment, users can use their personal computers 105 to upload location specific messages to the data management server 103. Refer to FIG. 9. At box 223, the message code is received at the device. The user may choose to enter a text or spoken identifier for this message code such as "directions to my house," so that when he returns home or to the office and desires to enter the actual body of the message associated with that message code, he knows what the message code is for. At box 228, he uses his computer to enter a text or voice message along with the unique message code using the WWW interface and HTTP server 104. This interface could be email or simply a WWW form template allowing the user to type in a message or attach a text or audio file containing the message, which is then submitted. Upon submission or being sent via email, the message is interpreted and stored in the database, in association with the specific message code 227.

Figure 10:
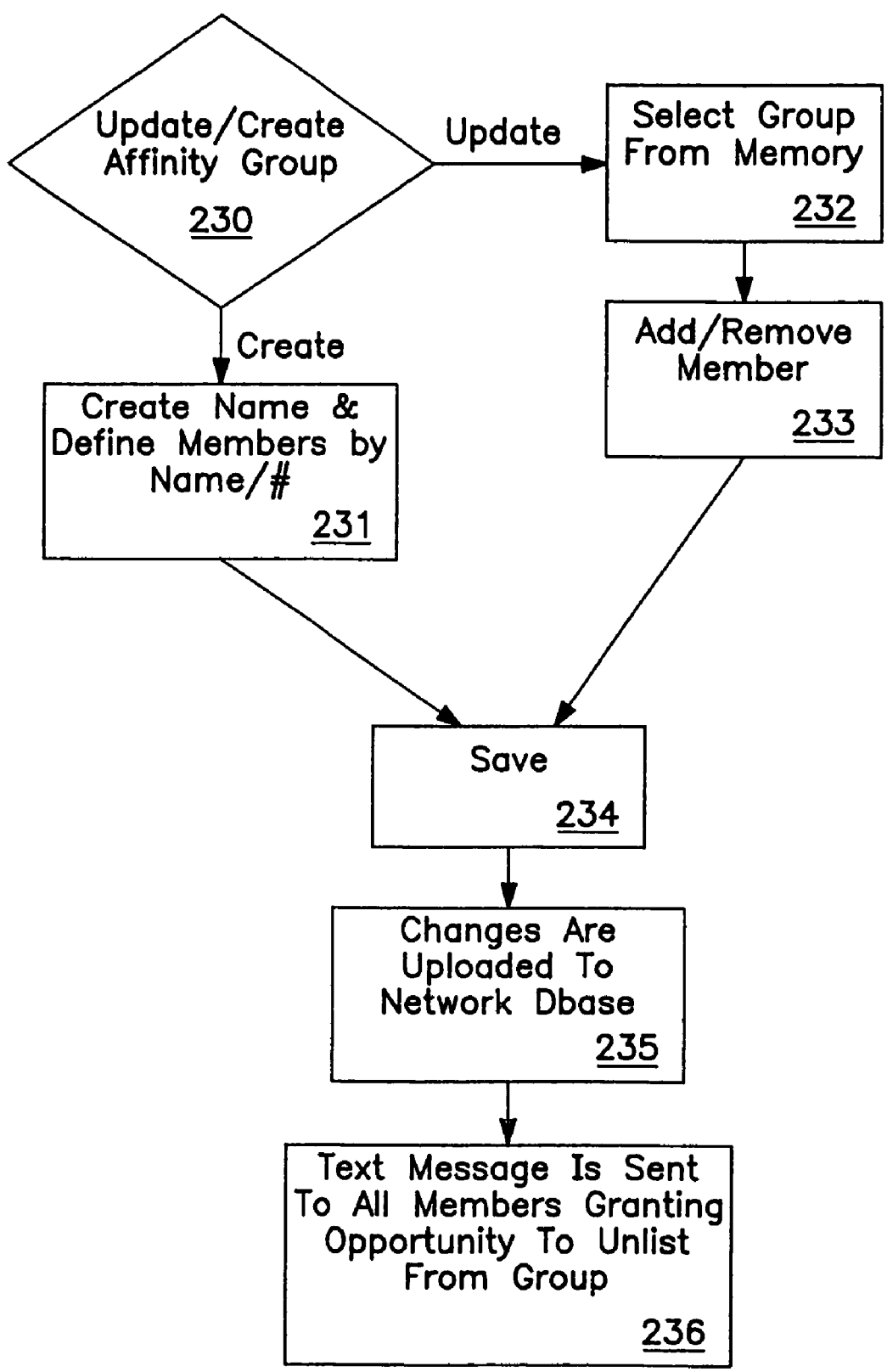
FIG. 10 illustrates the procedure for updating and creating an affinity group.

Another useful feature of the present invention is the ability for CMRS subscribers to create affinity groups for use with the present invention. Affinity groups allow persons to send messages on-demand to specific custom defined lists of other subscribers, and they also allow group members to be made aware of the others' proximity within the CMRS network. That is to say if a team of workers is distributed across the country, or a specific region, such as the mid-atlantic, and a particular member comes into the home area of another member, then the members will be made aware of the their proximity to one another. That is to say a group member would know that another group member from another city was in his area, and he could contact the other group member via his wireless device. Refer to FIG. 10. Choice point 230 defines a state whereby a subscriber can either update an existing or create a new affinity group. If he chooses to create a new group, he gives the group a characteristic name, such as "my friends", and defines the members of that group by inputting their wireless device numbers in association with their name, box 231. This could also be done by choosing name/number pairs from the memory of the device 102. If they are merely updating an affinity group, that is adding or removing a member, or deleting the group, then they choose a group from memory at step 232. The device, on demand, will display a list of all groups owned and belonged to by the subscriber. The subscriber selects a group that he is owner of. He will then add or remove a member at step 233 or delete the entire group. If it is not a group that he created, and hence owns, then he can only remove himself from the group. Whether creating anew or making a change to an existing group, the information is then saved by invoking a command at the user device at step 234. The changes are then uploaded to the network and saved in the database at step 235. Alternatively, all changes can be made at the network directly, using the device to engage a live session with the network to facilitate this. In order to protect the privacy of the CMRS subscribers, any time a subscriber is added to an affinity group, the person is sent an electronic message to their device notifying them of their inclusion in the group and the creator of the group, and granting them the opportunity to de-list themselves from the group at box 236. They will also have as an option on their account the right to prevent themselves from being included in any groups by default. When a person tries to add them to a group, they will receive a message back stating that the person could not be added to the group because of their security preferences. In this manner, the privacy of CMRS subscriber's will be protected with respect to affinity groups.

Figure 11:
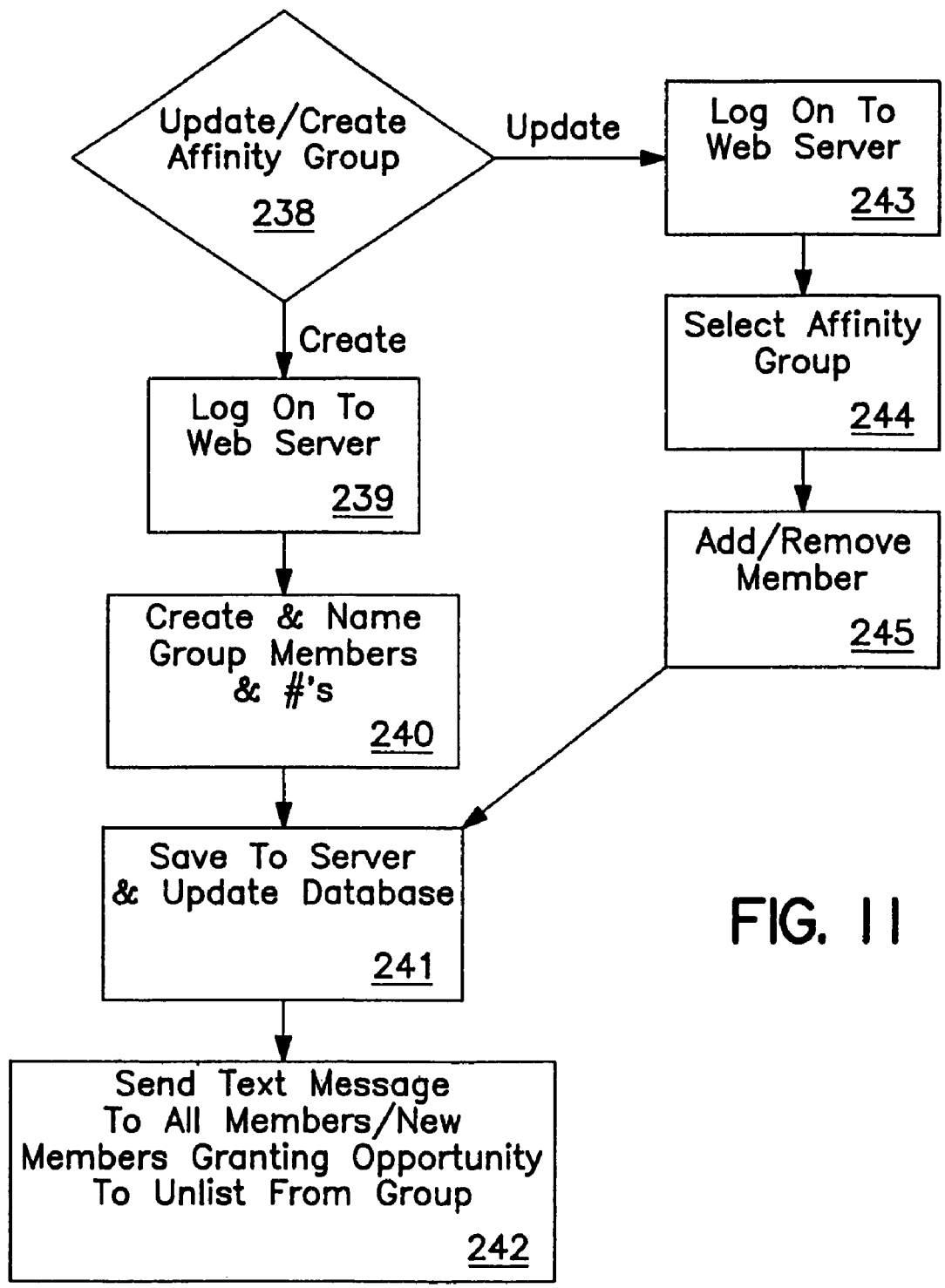
FIG. 11 illustrates the procedure for using the affinity group feature to update or create and then to send a message to all members of the group.

FIG. 11 illustrates an alternative embodiment for updating/creating affinity groups. At box 238, the user is faced with the choice point of either creating or updating an affinity group. If the choice is to create one, the subscriber uses his personal computer to log onto the WWW server interface at step 239. Using their wireless account number and pass code, they will be able to access the "create/update affinity group" section. They will select "create" 240 and designate the numbers and names of the group members. If they are updating an affinity group, they will logon to the server and select "update groups" 243. They will then select a particular affinity group from the list of available groups 244, and then either add or remove a member or members 245 or delete the group entirely. In either case the information is then saved by invoking a "save changes" command and the changes are uploaded to the database 241. A text message is then sent out to any new members notifying them of their inclusion within the group and granting them the opportunity to reject this inclusion at step 242.

Figure 12:
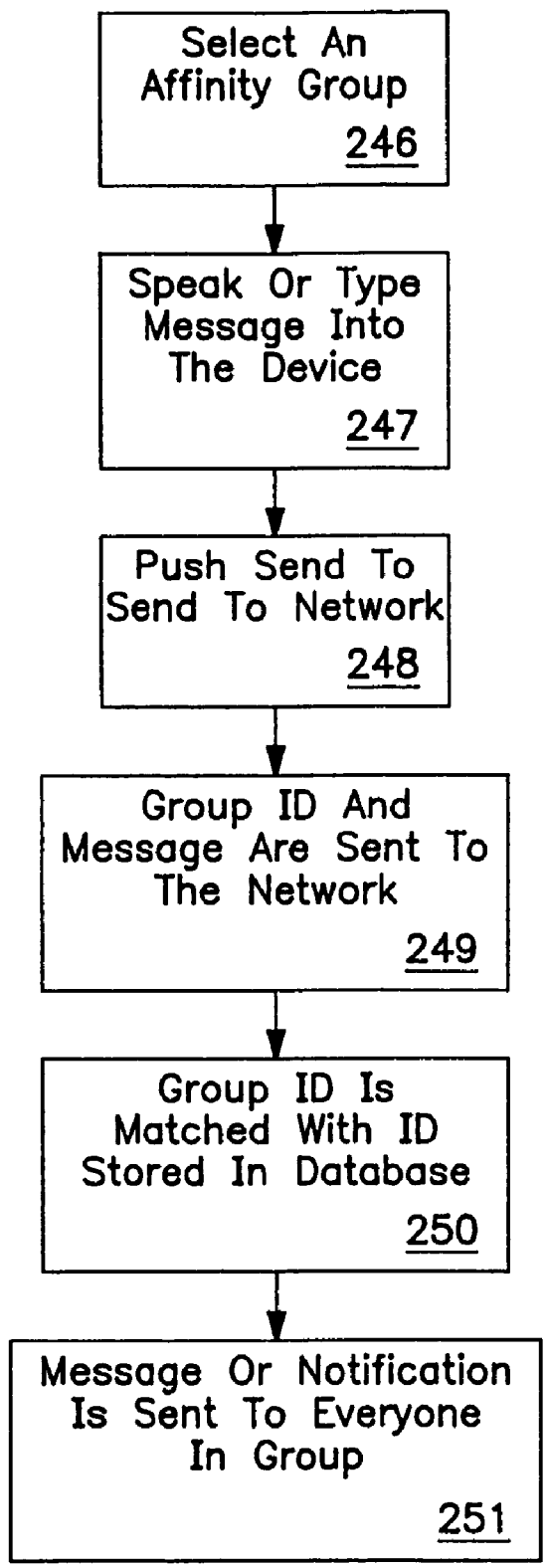
FIG. 12 illustrates the process of recording a message and sending it to members of an affinity group wherein the message is recorded at the user communication device.

A useful feature of the affinity groups is the ability to send out a single message to all group members simultaneous. Refer to FIG. 12. The user first selects an affinity group at box 246. A list of all active groups included in or owned is maintained in the user device or periodically uploaded to the user device by the network. The user then speaks or types a message into the device at 247. The user then pushes a "send" button, box 248, or issues a command which causes the message to be sent to the network, along with an affinity group ID so that it can be associated with all group members, box 249. The group ID is then matched with the ID in the database and is stored at 250. A message or notification of a message is then sent to everyone in the group, allowing them to view/listen to directly, or on-demand, the content of the message, box 251.

Figure 13:
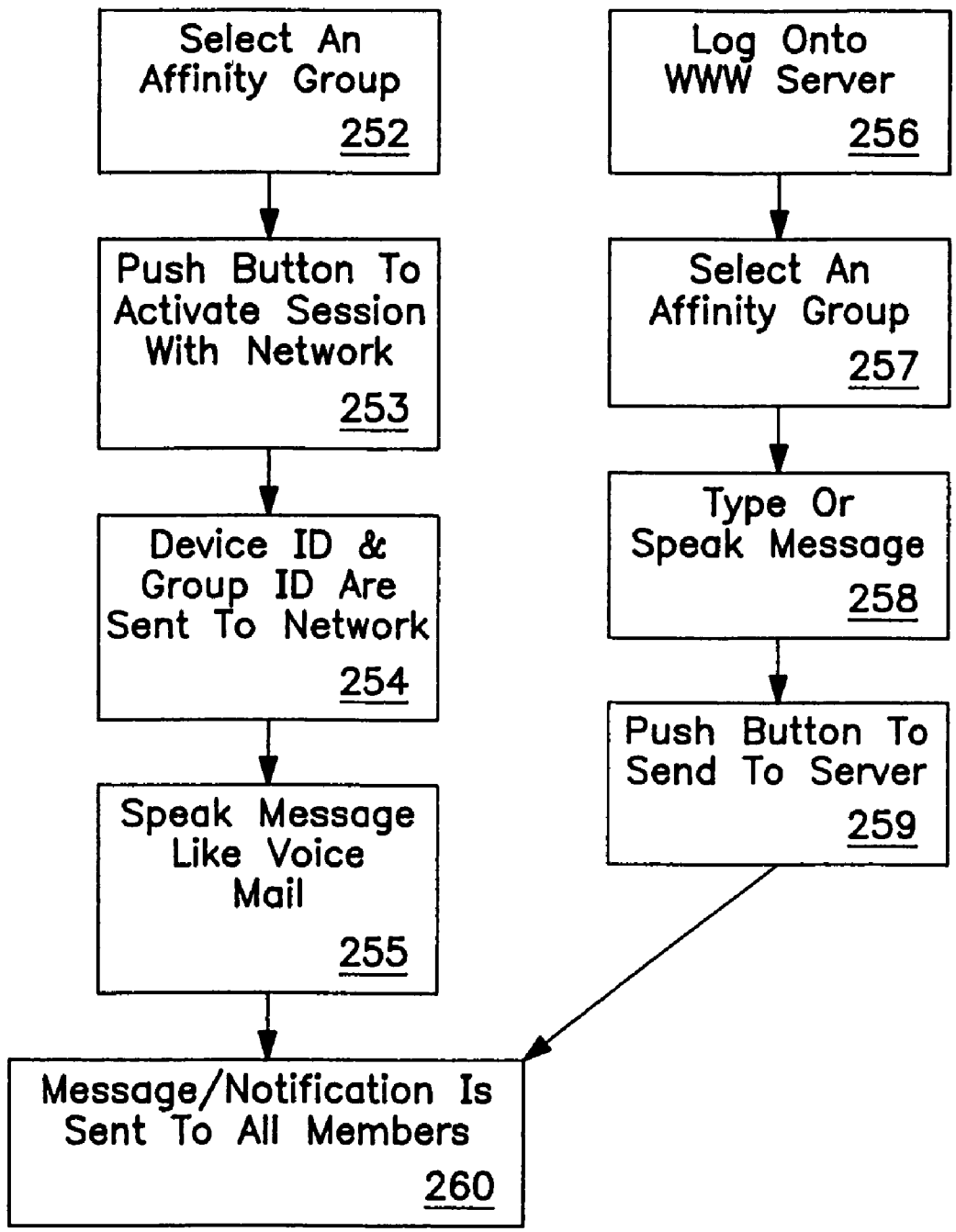
FIG. 13 illustrates the process for leaving messages for all members of an affinity group through either the WWW interface or direct use of the device.

In another alternative embodiment, a subscriber may leave affinity group messages by calling into the network directly or by using the WWW interface. Refer to FIG. 13. At box 252, a user selects an affinity group from those stored on his device. He pushes a button or issues a command which activates a live session with the network 253. In performing this action, the ID of the device as well as the group ID are sent to the network 254. The person than speaks his message and the message is recorded directly by the network 255, similar to leaving a voice mail message for the person. This message may or may not be associated with a specific coordinate location. Alternatively, the user may logon to the WWW server 256 to leave his affinity group message. In a first step, after logging in with his device number and pass code, an affinity group must be selected from the list of available groups 257. Then the user will either type a text message or attachs a spoken one as an audio file, or attaches any other type of file or message, at box 258. Finally, he will push a "submit" button to send the message to the server where it will be saved in the database in association with the group ID. At box 260, the message, or a notification of the message, is sent to all affinity group members.

Figure 14:
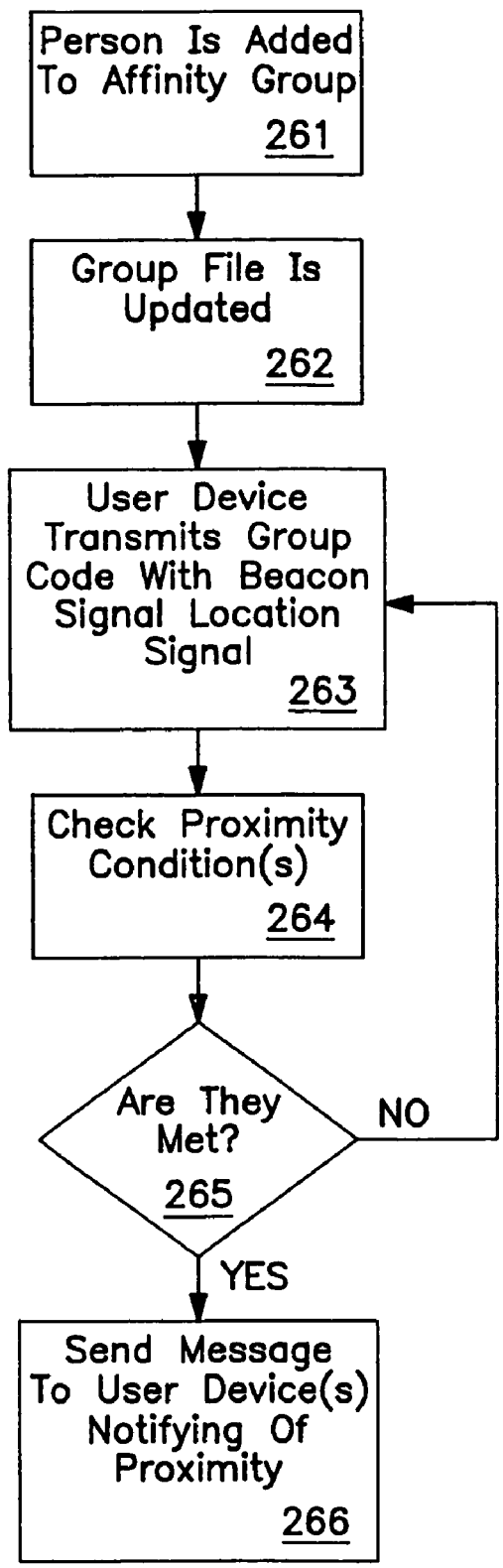
FIG. 14 illustrates the notification process with respect to members of an affinity group coming into proximity of one another.

Another useful feature of affinity groups is the ability to notify members of proximity to one another within in the CMRS network. FIG. 14 illustrate in flow diagram form the steps the system goes through to track affinity group members and notify them when proximity thresholds are achieved. At step 263, the user device transmits to the network the group code along with the outgoing device beacon signal. The system uses the group number and other information to check against the proximity conditions stored in the group file at box 264. The system faces a choice point at 265. If the conditions are not met, the system returns to step 263 to wait for the next incoming device signal. If the conditions are met, a notification is sent to the parties which are in proximity of one another, box 266.

Figure 15:
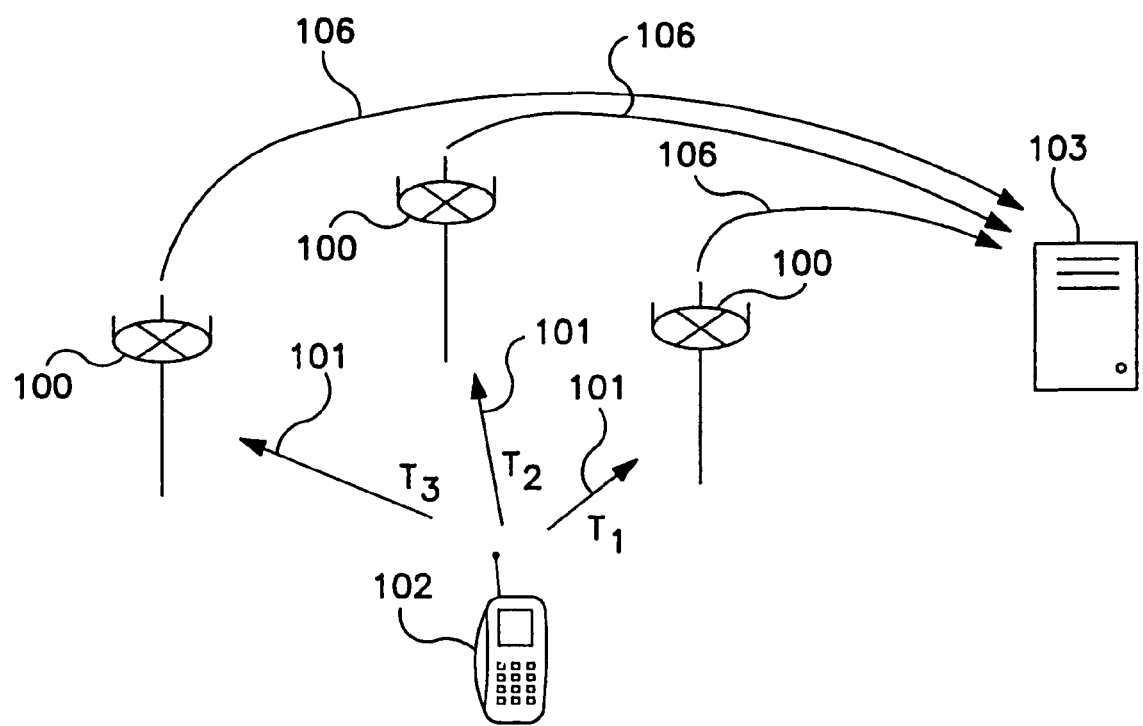
FIG. 15 illustrates an overview of an embodiment of the present invention in which the locating of the user device is performed by the network itself.
Figure 16:
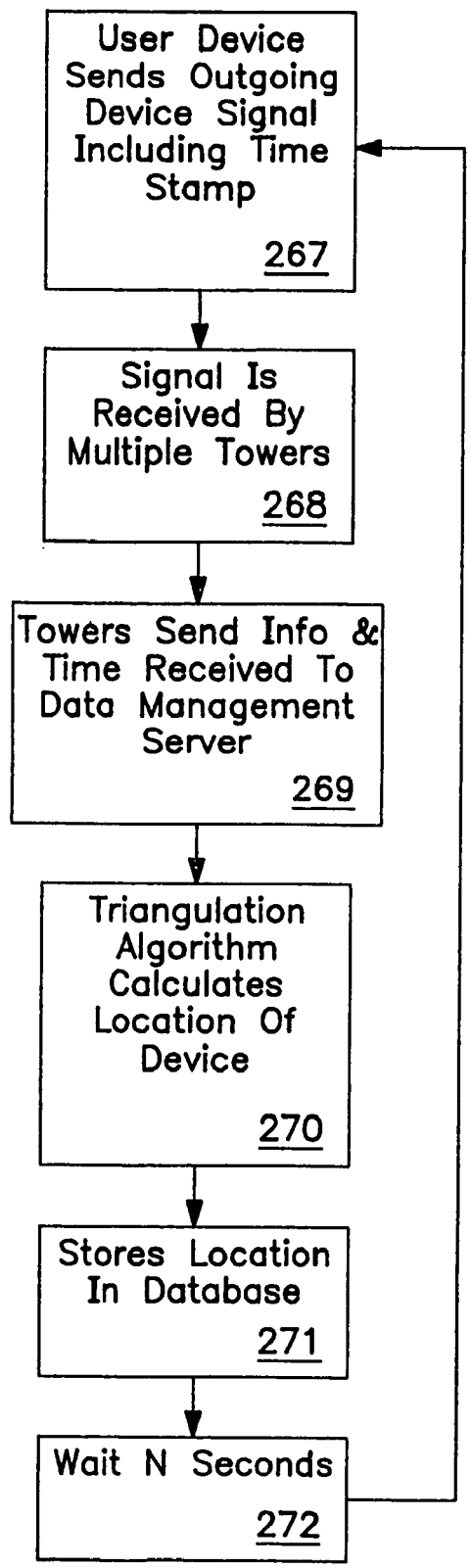
FIG. 16 illustrates in flow diagram form the steps performed by the system and the user when performing the location of the user device.

An important element of the invention is the use of triangulation or other location determining scheme. This ability to pinpoint the location of a user device is what allows for all the functionality of the present invention. In the absence of a GPS solution, this can be performed by hardware in the network or hardware in the device itself. In either approach, the relative propagation times of three or more synchronized signals, the magnitude of several signals, the angle of arrival of signals, and combinations of the above can be used to determine an accurate position of the device. FIG. 15 demonstrates an overview of the system when the network itself is performing the triangulation or signal measurements to determine a location. In this embodiment, user device 102 sends a signal which could be the outgoing device signal 206 to the network. This signal is picked up by nearby towers 100 and transmitted electrically 106 to the data management server 103. The server then uses this information to run a triangulation algorithm or other signal characteristic algorithm to determine the location of the device. The device is not required to make any calculations; however, the system is taxed heavily by performing these calculations continuously for all participating subscribers. FIG. 19 illustrates this process in flow diagram form. At point 267, the user device sends the outgoing device signal to the network, including a time stamp. The signal is received by three or more towers, 268. The towers then send the information and the time that the signal was received by each to the data management server, 269. The server then runs a triangulation or other signal characteristic algorithm using all this information as inputs, at box 270, to derive a specific coordinate location of the device within the network. This coordinate location is stored in a location database for the particular user device on the server, 271. The system then waits N seconds before receiving the next outgoing device signal from the same device, 272.

Figure 17:
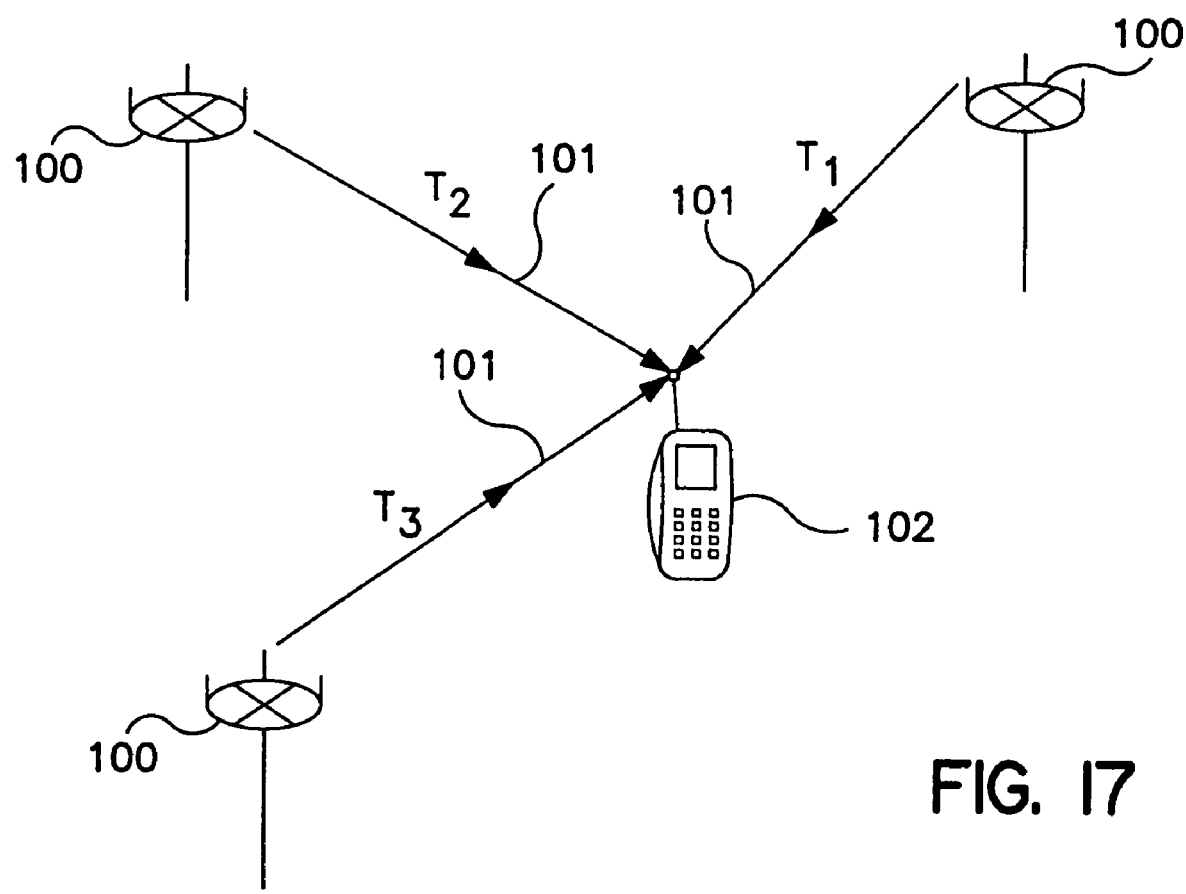
FIG. 17 illustrates an overview of an embodiment of the present invention in which the locating of the user device is performed by the user device itself.
Figure 18:
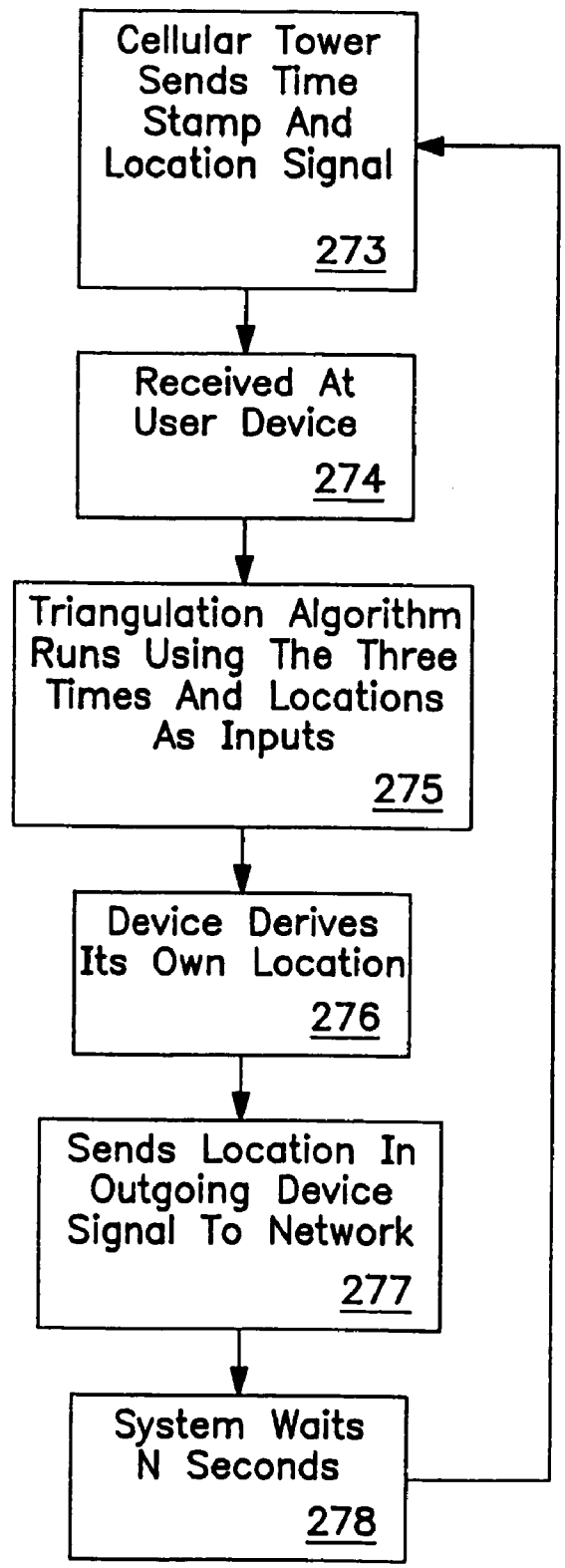
FIG. 18 illustrates in flow diagram form the steps performed by the system and the user when the device itself performs the triangulation function.

FIG. 17 illustrates an overview of the same system where the device itself is performing the triangulation or signal calculation. The device will have to possess processing capability for performing this calculation every N seconds without noticeably detracting from the performance of the device. A DSP chip may be integrated into the device for providing such computational capability. In this embodiment, wireless transceiver towers 100 transmit a signal 101, including their location, at the same instant in time. They are received by the user device 102 at varying times depending upon their relative distance. They will also vary in signal strength and angle of arrival according to their distance and position. This information is then used by the device 102 to calculate its location relative to the fixed position of the signals received. Refer to FIG. 18 for a flow chart diagram of this process. At box 266, the towers send a time synchronized location signal. The signal(s) are received at the user device at varying times, box 267. The device itself performs a triangulation algorithm or other signal characteristic algorithm, box 268. Through this process the device is able to determine its own location in 2-D coordinate space, 269. This location information is then sent as part of the outgoing device signal to the network 270, after which the system waits N seconds before sending out the next signal 271.

The preferred and optimumly preferred embodiments of the present invention have been described herein and shown in the accompanying drawings to illustrate the underlying principles of the invention, but it is to be understood that numerous modification and ramifications may be made without departing from the spirit or scope of this invention.

What is claimed is:

1. A messaging method for use in a mobile radio service provider network associated with coordinate way points and a plurality of subscriber devices, the method comprising:
   receiving a user-generated message from a subscriber device including a receiver designation within the network, wherein the received message is associated with the coordinate way point and the received message is associated with a specific area of granularity and a time period during which the received message is available;
   storing the user-generated messages within the network;
   determining when the subscriber devices are in range of the coordinate way point and can receive the received message based on the associated receiver designation, wherein the determining is based on a profile and a location of the subscriber device; and
   sending the received message to the determined subscriber devices.

2. The messaging method according to claim 1, wherein the area of granularity is pre-set by either the network or the devices.

3. The messaging method according to claim 1, wherein the area of granularity is selectable by either the network or the devices.

4. The messaging method according to claim 1, wherein the time period is pre-set by either the network or the devices.

5. The messaging method according to claim 1, wherein the time period is selectable by either the network or the devices.

6. A messaging method comprising:
receiving a user-generated message from a first user device, the message including a receiver designation, a level of granularity around a coordinate location that the message may be made available to at least one second user device;
storing the message;
determining recipients of the stored message, wherein the determining is based on a profile, a location of the at least one second user device, and the level of granularity of the stored message; wherein
the profile of the at least second user device includes a name and an interest of the second user,
the level of granularity includes an area surrounding the coordinate location that the message is accessible;
sending the stored message to the determined at least one second user.

7. A messaging system comprising:
a messaging server configured to communicate with a plurality of devices;
the server including
a receiver, the receiver configured to receive a user-generated message from the devices, the message including a receiver designation, a level of granularity around a coordinate location that the message may be made available to the devices;
a memory, the memory configured to store the message;
a determination module configured to determine recipients of the stored message, wherein the determining is based on a profile, a location of the devices, and the level of granularity of the stored message; wherein
the profile of the devices include a name and an interest of a user, the level of granularity includes an area surrounding the coordinate location that the message is accessible;
a transmitter, the transmitter configured to transmit the stored message to the determined recipients.

8. The system according to claim 7 wherein said devices include personal computers, cell phones, personal digital assistants or user-supported computers.

9. The system according to claim 7 wherein a location of said devices is determined by utilizing a positioning algorithm based on a method selected from the group consisting of triangulation of multiple signals, signal strengths of multiple signals, time difference of arrival of different signals, angle of arrival differences of different signals, GPS signals, and combinations thereof.

10. The system according to claim 7 wherein the messaging server communicates with the plurality of devices over a wireless network, said network is divided up into a two-dimensional grid of grid points, said network associating a physical location of the device with one or more of said grid points.

11. The system according to claim 10 wherein said network communicates using a protocol selected from the group consisting of CDMA, TDMA, FDMA, wide-band CDMA.

12. The system according to claim 7 wherein the messaging server communicates with the plurality of devices over a wireless network, said network is divided up into a three-dimensional grid of grid points, said network associating a physical location of the devices with one or more of said grid points.

13. The system according to claim 12 wherein said network communicates using a protocol selected from the group consisting of CDMA, TDMA, FDMA, wide-band CDMA.

* * * * *